(12) United States Patent
Morgan

(10) Patent No.: US 11,346,303 B2
(45) Date of Patent: May 31, 2022

(54) THRUST REVERSER ACTUATION SYSTEM

(71) Applicant: Goodrich Actuation Systems Limited, West Midlands (GB)

(72) Inventor: Antony Morgan, Wolverhampton (GB)

(73) Assignee: GOODRICH ACTUATION SYSTEMS LIMITED, Solihull West Midlands (GB)

( * ) Notice: Subject to any disclaimer, the term of this patent is extended or adjusted under 35 U.S.C. 154(b) by 331 days.

(21) Appl. No.: 16/407,251

(22) Filed: May 9, 2019

(65) Prior Publication Data
US 2019/0360430 A1 Nov. 28, 2019

(30) Foreign Application Priority Data
May 25, 2018 (EP) ..................................... 18275070

(51) Int. Cl.
*F02K 1/76* (2006.01)

(52) U.S. Cl.
CPC ........ *F02K 1/763* (2013.01); *F05D 2270/051* (2013.01)

(58) Field of Classification Search
CPC ... F02K 1/763; F02K 1/70; F02K 1/72; F05D 2270/60; F05D 2270/66; F05D 2270/46
See application file for complete search history.

(56) References Cited

U.S. PATENT DOCUMENTS

| | | | |
|---|---|---|---|
| 6,167,694 B1 * | 1/2001 | Davies ..................... | F02K 1/763 60/226.2 |
| 7,946,106 B2 | 5/2011 | Dehu et al. | |
| 8,151,550 B2 | 4/2012 | Dehu et al. | |
| 8,931,253 B2 | 1/2015 | Baudu et al. | |
| 9,126,690 B2 | 9/2015 | Moradell-Caselsas | |
| 9,303,590 B2 | 4/2016 | West et al. | |
| 2004/0188211 A1 | 9/2004 | Christensen | |
| 2007/0095049 A1 | 5/2007 | Eschborn et al. | |
| 2011/0192135 A1 * | 8/2011 | McKay .................. | F02K 1/763 60/226.2 |
| 2011/0296812 A1 * | 12/2011 | Abel ....................... | F02K 1/763 60/226.2 |
| 2013/0312387 A1 * | 11/2013 | West ....................... | F02K 3/075 60/226.2 |
| 2017/0204811 A1 | 7/2017 | Davies | |
| 2017/0321635 A1 * | 11/2017 | Mansouri ................ | F02K 1/56 |

FOREIGN PATENT DOCUMENTS

GB 2408725 A 6/2005

OTHER PUBLICATIONS

EPO Official Letter for Application No. 18275070.3, dated Apr. 1, 2021, 6 pages.
Extended European Search Report for International Application No. 18275070.3 dated Nov. 7, 2018, 7 pages.

* cited by examiner

*Primary Examiner* — Andrew H Nguyen
(74) *Attorney, Agent, or Firm* — Cantor Colburn LLP

(57) ABSTRACT

A thrust reverser actuation system includes a first cowl actuation system for translating a first cowl of a thrust reverser and a second, separate cowl actuation system for translating a second cowl of the thrust reverser. The system also includes a device operatively connected between the first cowl actuation system and the second cowl actuation system, and configured to transmit drive from one of the first and second cowl actuation systems to the other of the first and second cowl actuation systems in the event of a failure of the other of the first and second cowl actuation systems.

5 Claims, 2 Drawing Sheets

THRUST REVERSER ACTUATION SYSTEM

FOREIGN PRIORITY

This application claims priority to European Patent Application No. 18275070.3 filed May 25, 2018, the entire contents of which is incorporated herein by reference.

FIELD

The present disclosure relates generally to a thrust reverser actuation system ("TRAS") for an aircraft gas turbine engine.

BACKGROUND

Aircraft thrust reversers typically employ one or more TRAS, which are configured to actuate a thrust reverser. The TRAS may utilise translating cowls that are configured to translate in use to open up an array of cascade vanes. At least two cowl actuation systems are typically used to transmit drive from a motor to two translating cowls, wherein the cowl actuation systems are symmetrical, but separate. Failure of one or more components of a cowl actuation system, in particular a primary drive shaft associated with one of the cowl actuation systems, will have the effect of causing the respective translating cowl to accelerate rapidly, due to its exposure to high velocity airflow. Certain safety devices are known in the art for arresting such acceleration, for example a torsion shaft or further braking devices. However, such components are undesirably very heavy.

It is desired to improve the operation of a TRAS employing at least two translating cowls.

SUMMARY

According to an aspect of the disclosure, there is provided a thrust reverser actuation system ("TRAS"), comprising a first cowl actuation system for translating a first cowl of a thrust reverser, a second, separate cowl actuation system for translating a second cowl of the thrust reverser, and a device operatively connected between the first cowl actuation system and the second cowl actuation system, and configured to transmit drive from one of the first and second cowl actuation systems to the other of the first and second cowl actuation systems in the event of a failure or reduced drive of the other of the first and second cowl actuation system.

The above arrangement means that a cowl of an adjacent cowl actuation system may still be actuated or arrested, even in the event of a failure or reduced drive of this system, leading to safety and reliability improvements.

The device may comprises one or more shafts operatively connected between the first cowl actuation system and the second cowl actuation system. The shafts may be rotatable with the first cowl actuation system and the second cowl actuation system.

The device may comprise a lost motion device configured to drive the other of the first and second cowl actuation systems, in the event of a failure or reduced drive of the other of the first and second cowl actuation systems.

The thrust reverser actuation system may further comprise a motor (e.g., a common motor) configured to drive the first and second cowl actuation systems. These embodiments provide a simple solution to the problem of how to improve reliability and safety of a thrust reverser actuation system incorporating two cowl actuation systems driven by a common motor. The motor may be an electric motor.

The thrust reverser actuation system may further comprise a brake operatively connected to the motor and configured to stop or hold (e.g., arrest) a load connected to the motor upon loss of electrical power to the motor. The load may correspond to one or both of the first and second cowl actuation systems, and/or components thereof.

The first and second cowl actuation systems may each comprise a separate primary drive shaft operatively connected to the motor, wherein each primary drive shaft may provide the main drive for the respective first or second cowl actuation system. Each primary drive shaft may be configured to drive a respective translating cowl. Each primary drive shaft may be connected to a respective cowl via one or more gearboxes.

The device may be configured to transmit drive from the primary drive shaft of one of the first and second cowl actuation systems to one or more components of the other of the first and second cowl actuation systems in the event of a failure or reduced drive of the other of the first and second cowl actuation systems.

This means that one of the first and second cowl actuation systems can operate to arrest or actuate the other, using the drive received from the motor and through the respective primary drive shaft.

The first and second cowl actuation systems may each comprise one or more actuators configured to move a respective cowl between a stowed position and a deployed position.

The one or more actuators may each comprise a screw shaft and a ballscrew nut, wherein rotation of the screw shaft may be configured to move one of the screw shaft and ballscrew nut along the longitudinal axis of the screw shaft to move the respective cowl between a stowed position and a deployed position. The principles described herein are seen to be particularly suited to actuation of cowls that are driven in a rotary system, for example using ballscrew actuators.

The device may comprise a first shaft operatively connected to the first cowl actuation system, a second shaft operatively connected to the second cowl actuation system, and one or more intermediate components configured to transmit drive between the first shaft and the second shaft.

The rotation of the first and second shafts (e.g., the speed and direction thereof) may correspond to and/or correlate directly with the rotation (e.g., the speed and direction thereof) of the primary drive shaft of a respective one of the first and second cowl actuation systems, e.g., during normal operation.

The device may comprise one or more axially extending members connected to and rotatable with the first shaft and configured to engage, via the one or more intermediate components, one or more axially extending members connected to and rotatable with the second shaft, to transfer drive between the first shaft and the second shaft.

The one or more intermediate components may comprise a rotatable intermediate component comprising a plurality of members that are configured to cooperate with the axially extending members of the first and second shafts upon rotation of the first and second shafts, such that rotation of one or both of the first and second shafts causes a corresponding rotation of the intermediate component.

Upon failure or reduced drive of one of the first shaft and the second shaft drive may be transmitted to the other of the first shaft and the second shaft via the axially extending members and cooperating members. The first shaft, second shaft and intermediate components may be rotatable about the same (e.g., a common) axis of rotation.

The thrust reverser actuation system may further comprise one or more sensors connected to the first and second cowl actuation systems and configured to detect full deployment of the first cowl and/or the second cowl.

The device may be configured to transmit drive from one of the first and second cowl actuation systems to the other of the first and second cowl actuation systems as aforesaid to an extent that permits the one or more sensors to detect full deployment of the first cowl and/or the second cowl.

This means that the thrust reverser actuation system can operate (albeit less efficiently) to an extent that permits an aircraft incorporating the thrust reverser actuation system to avoid potentially catastrophic damage whilst notifying a pilot (e.g., via the one or more sensors) that there is a fault that needs to be rectified.

Aspects of the disclosure extend to a gas turbine engine incorporating the thrust reverser actuation system described above, and further to an aircraft incorporating the gas turbine engine or thrust reverser actuation system.

BRIEF DESCRIPTION OF THE DRAWINGS

Various embodiments will now be described, by way of example only, and with reference to the accompanying drawings in which.

DETAILED DESCRIPTION

Herewith will be described various embodiments of a thrust reverser actuation system ("TRAS") that aims to deal with the problem of a primary shaft from the motor of such a system failing during a deployment. As will be described in more detail below, the present disclosure is aimed at providing a lost motion device to interconnect the shaft of a first cowl actuator with the shaft of a second cowl actuator.

Figure 1:
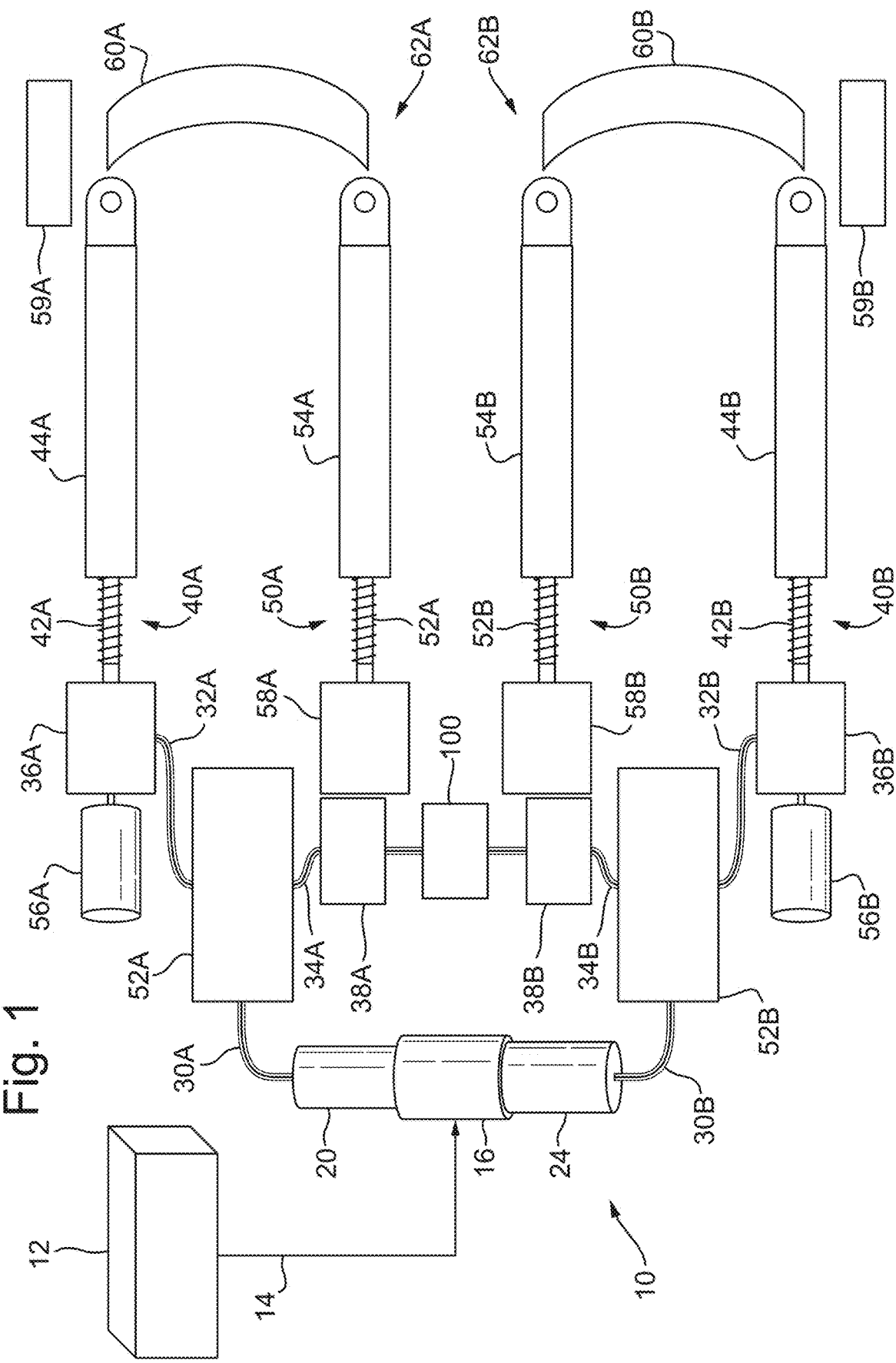
FIG. 1 shows an arrangement of a TRAS in accordance with an embodiment of the present disclosure.

FIG. 1 shows an arrangement of a TRAS 10 for an aircraft. The system 10 may be part of a gas turbine engine of the aircraft. It should be noted that FIG. 1 is highly schematic, and is provided merely to show the various connections between the various components of the system 10.

The system 10 comprises an electric drive channel 12 that is configured to receive operational commands from an aircraft computer, for example a command to deploy the thrust reverser. The electric drive channel 12 is further configured to output a signal along a transmission line 14, which signal is received by a motor 16. The motor 16 may be any suitable motor, for example a brushless DC electric ("BLDC") motor that is capable of actuating the various components of the system 10.

A brake 20 may be operatively connected to the motor 16 and configured to stop or hold the load connected to the motor 16 (in this case a thrust reverser) when electrical power is accidentally lost or intentionally disconnected. Such a brake may be referred to in the art as a "power off" or "fail safe" brake. The motor 16 is used to actuate thrust reverser components, as described in more detail below. Such components may be associated with a load that is able to cause a sudden and fast acceleration of the motor 16 (e.g., due to the load being moved into a high velocity air flow). As such, the brake 20 is provided to prevent sudden and fast acceleration of the components of the system 10 upon an electrical failure of the motor 16.

The motor 16 may also be operatively connected to one or more sensors 24 configured to sense the rotary speed and other characteristics of the motor 16, to allow detection of an electrical failure and implementation of the brake 20. The one or more sensors 24 may include a hall effect sensor and/or an electrical resolver.

In the illustrated embodiment the motor 16 is shown as being configured to drive first and second cowl actuation systems 62A, 62B. The first cowl actuation system 62A is associated with a first thrust reverser cowl 60A, whilst the second cowl actuation system 62B is associated with a second, separate thrust reverser cowl 60B. It is envisaged that the principles described herein may be applied to systems involving more than two thrust reverser cowls, however, and the disclosure should not be seen as being limited to such a situation.

Each thrust reverser cowl 60A, 60B may be configured in any manner as is known in the art. For example, each thrust reverser cowl 60A, 60B may be configured to uncover a cascade of thrust reverser vanes that, upon deployment, redirect airflow that is flowing away from the direction of motion of the aircraft such that it flows in the direction of motion to assist in slowing the aircraft.

Referring to the first cowl actuation system 62A, the motor 16 is configured to drive a first 60A of the thrust reverser cowls (i.e., move the first thrust reverser cowl 60A between stowed and deployed positions) via a number of components of this system 62A, which will now be described in more detail.

The motor 16 is connected to a primary gearbox 52A via a primary shaft 30A, which is typically a single input, dual output gearbox, allowing the power transmitted through the shaft 30A (the "input") to drive first and second output shafts 32A, 34A, wherein the power transmitted to each of the first and second output shafts 32A, 34A may be substantially the same.

The first output shaft 32A is configured to drive a first ballscrew mechanism 40A via a first secondary gearbox 36A, which is typically configured to transmit the drive received from the first output shaft 32A via 90 degrees to drive the first ballscrew mechanism 40A. The first ballscrew mechanism 40A may comprise a screw shaft 42A and ballscrew 44A, wherein rotation of the screw shaft 42A causes the ballscrew 44A to move along the longitudinal axis of the screw shaft 42A.

The second output shaft 34A is configured to drive a second ballscrew mechanism 50A via a second secondary gearbox 38A and a lock system 58A.

The second secondary gearbox 38A is typically configured in the same manner as the first secondary gearbox 36A described above, namely to transmit the drive received from the second output shaft 34A via 90° to drive the second ballscrew mechanism 50A. The second ballscrew mechanism 50A may comprise a screw shaft 52A as well as a ballscrew 54A. As discussed above in respect of the first ballscrew mechanism 40A, rotation of the screw shaft 52A causes the ballscrew 54A to move along the longitudinal axis of the screw shaft 52A.

The lock system 58A is typically referred to as a "primary lock", and is configured to prevent the initial movement of the ballscrew 54A in the direction of actuation and out of its stowed position. Various such lock systems are known in the art, for example incorporating solenoid locks, although any suitable lock system may be employed in the present arrangements.

An additional lock system 59A is typically provided and may be known in the art as a "track lock" or "tertiary lock".

The lock system 59A may be configured to move a lock member into the path of the ballscrew 44A of the first ballscrew mechanism 40A to provide a method of preventing deployment of the thrust reverser, in addition to the lock system 58A.

One or more sensors 56A may be connected to the first secondary gearbox 36A of the first ballscrew mechanism 40A (or directly to the first ballscrew mechanism 40A), which sensors 56A may be configured to measure the displacements of the first ballscrew mechanism 40A. The one or more sensors 56A may include, for example, a rotary variable differential transformer ("RVDT"). The sensors 56A may be configured to detect deployment of the thrust reverser, by detecting the amount of displacement of the first ballscrew mechanism 40A.

The components of the second cowl actuation system 62B are identical to those of the first cowl actuation system 62A. That is, the motor 16 is configured to drive a second 60B of the thrust reverser cowls (i.e., move the first thrust reverser cowl 60A between stowed and deployed positions) via a number of components, which are identical to the components described above that drive the first thrust reverser cowl 60A. As such, for the sake of brevity, the description of these components will not be repeated. Like reference numerals referring to components of the second cowl actuation system 62B (for driving the second thrust reverser cowl 60B) in FIG. 1 indicate like elements of those of the first cowl actuation system 62A (for driving the first thrust reverser cowl 60A), except with the letter "A" replaced with the letter "B".

In accordance with the disclosure the TRAS 10 comprises a device 100 operatively connected between the first cowl actuation system 62A and the second cowl actuation system 62B, and configured to transmit drive from one of the first and second cowl actuation systems 62A, 62B to the other of the first and second cowl actuation systems 62A, 62B in the event of a failure of the other of the first and second cowl actuation systems 62A, 62B.

The device 100 may comprise one or more shafts operatively connected to the second secondary gearbox 38A of the first cowl actuation system 62A and the second secondary gearbox 38B of the second cowl actuation system 62B, and may be configured to utilise lost motion in one of the first and second cowl actuation systems 62A, 62B to drive the other of the first and second cowl actuation systems 62A, 62B, in the event of a failure of the other of the first and second cowl actuation systems 62A, 62B. The device may be a "lost motion device" as it is generally known in the art.

Failure of one or more components of the cowl actuation systems 62A, 62B, in particular one of the primary drive shafts 30A, 30B, will have the effect of causing the respective cowl 60A, 60B to accelerate rapidly. Certain safety devices are known in the art for arresting such acceleration, for example a torsion shaft or other braking devices. However, such components are undesirably very heavy.

Providing a device 100 as described herein means that failure of, for example, one of the primary drive shafts 30A, 30B allows the motor 16 to control both cowl actuation system 62A, 62B, albeit with more difficulty than during normal operation.

Figure 2:
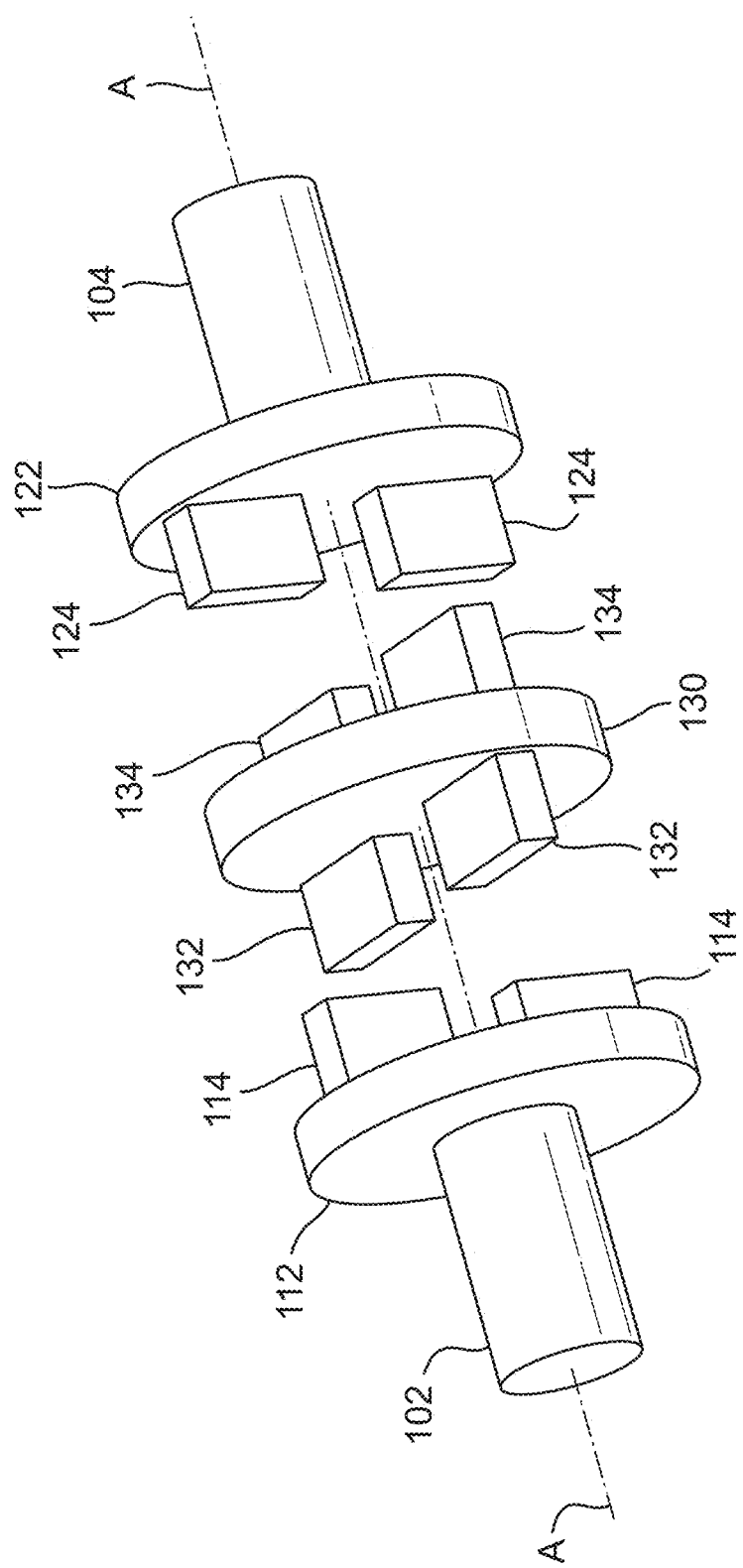
FIG. 2 shows schematically an exploded view of a device for use with the TRAS shown and described in FIG. 1.

FIG. 2 show schematically an exploded view of a device 100 that operates in the above manner. This is one example of such a device (i.e., a "lost motion device"), and the skilled person would be able to extend this teaching and utilise any suitable lost motion device in the broadest aspects of the present disclosure.

The device 100 comprises a first shaft 102 that may be operatively connected to the first cowl actuation system 62A. The first shaft 102 is rotatable with one or more components of the first cowl actuation system 62A, for example the second secondary gearbox 38A thereof, such that upon actuation of the first cowl actuation system 62A the first shaft 102 rotates.

The device 100 comprises a second shaft 104 that may be operatively connected to the second cowl actuation system 62B. The second shaft 104 is rotatable with one or more components of the second cowl actuation system 62B, for example the second secondary gearbox 38B thereof, such that upon actuation of the second cowl actuation system 62B the second shaft 104 rotates.

The first shaft 102 is rotatable about an axis A and terminates in a radially extending flange 112 (i.e., radial relative to the axis A) that comprises two axially extending members or dogs 114. Similarly, the second shaft 104 is rotatable about the axis A and terminates in a radially extending flange 122 that comprises two axially extending members or dogs 124.

The device 100 further comprises an intermediate component 130 that is also in the form of a radially extending flange and is rotatable about the axis A. The intermediate component 130 comprises a plurality of members 132, 134 that are configured to cooperate with the axially extending members 114, 124 upon rotation of the first and second shafts 102, 104 respectively.

In normal use, the first shaft 102 and the second shaft 104 will typically rotate at the same rate and by the same amount. As such, the axially extending members 114, 124 of the first and second shafts 102, 104 will both contact cooperating members 132, 134 on the intermediate component 130 and rotate it at substantially the same rate and by substantially the same amount. Small differences may be experienced due to different frictional forces (for example) in each of the first and second cowl actuation systems 62A, 62B. For example, if one shaft rotates, e.g., faster than the other for a limited period of time, then drive will be transferred to the other shaft through the device 100. Once the shafts are rotating at the same speed (if that is the case), they will rotate at substantially the same rate and so drive will no longer be transferred.

To achieve this the drive may be transferred from the device 100 into a respective one of the second secondary gearboxes 38A, 38B, which may each be configured to add any drive or torque received to any drive or torque received from the motor 16, such that the second secondary gearboxes 38A, 38B act as a summing junction for the drive received from the device 100 and the motor 16. The drive received by the second secondary gearboxes 38A, 38B from the device 100 could be transferred through the various components of the respective cowl actuation system 62A, 62B to actuate a respective one of the cowls 60A, 60B.

In various embodiments, therefore, the device 100 allows the cowls 60A, 60B to actuate by the same amount (e.g., line up with each other) along the length of travel, even though different frictional forces may be experienced by the different cowl actuation systems 62A, 62B during this time.

Upon failure of one or other of the first and second cowl actuation systems 62A, 62B, one of the first shaft 102 and the second shaft 104 will no longer be under the control of the motor 16 and/or the brake 20, and will be free to rotate without restriction. This can prevent deployment, if, for example, the cowl in question is stowed, or cause unwanted deployment or movement if the cowl (or other component) is exposed to a high velocity airflow. In this situation, in accordance with the present disclosure the other of the first shaft 102 and the second shaft 104 can transfer drive to the device 100, and also prevent undesired movement.

For example, should the second shaft 104 cease to be driven due to failure of the second cowl actuation system 62B, then the first cowl actuation system 62A will operate and continue to drive the first shaft 102 of the device 100. The axially extending members 114 will contact the cooperating members 132 on the intermediate component and rotate it. The cooperating members 134 on the intermediate component 130 will then drive the axially extending members 124 on the second shaft 104. As such, drive will be transferred between the first shaft 102 and the second shaft 104.

At the same time, if the second cowl 60B is exposed to a high velocity airflow, then this might cause the second shaft 104 of the device 100 to rotate rapidly. This rotation will, however, be arrested by the device 100, since the axially extending members 124 that rotate with the second shaft 104 will contact the cooperating members 134 and then be driven (or arrested) by the first shaft 102. Since the first shaft 102 remains under the control of the motor 16 and/or the brake 20, the second shaft 104 will be driven in the same manner as the first shaft 102, via the device 100.

Various modifications may be made to the arrangement of FIG. 2 in order to achieve a suitable device for any particular application.

For example, the illustrated device 100 comprises one approximately a +/−150 degree relative travel before the device 100 operates to transfer drive between the first shaft 102 and second shaft 104. That is, if one of the axially extending members 114 of the first shaft 102 were in contact with one of the cooperating members 132 at a first angular position, then (assuming the intermediate component 130 remained stationary) the axially extending member 114 would need to rotate roughly 150 degrees in order to contact the other cooperating member 132. This angle could be modified by moving the position(s) of the axially extending members 114, 124 and/or the cooperating members 132, 134 accordingly, or adding additional axially extending members and/or cooperating members. The angle between the axially extending members 114, 124 and the cooperating members 132, 134 could be set on installation. In addition, this angle is the same for each set of axially extending members 114, 124, but could be different for the axially extending members 114 on the first shaft 102 and the axially extending members 124 on the second shaft 104.

Aspects of the disclosure extend to a gas turbine engine incorporating the thrust reverser actuation system described above, and further to an aircraft incorporating the gas turbine engine or thrust reverser actuation system.

Although the present disclosure has been described with reference to various embodiments, it will be understood by those skilled in the art that various changes in form and detail may be made without departing from the scope of the invention as set forth in the accompanying claims.

The invention claimed is:

1. A thrust reverser actuation system, comprising:
a first, cowl actuation system for translating a first cowl of a thrust reverser;
a second, separate cowl actuation system for translating a second cowl of the thrust reverser;
a device operatively connected between the first cowl actuation system and the second cowl actuation system, the device comprising a first shaft operatively connected to the first cowl actuation system, a second shaft operatively connected to the second cowl actuation system, one or more intermediate components configured to transmit drive between the first shaft and the second shaft, and one or more axially extending members connected to and rotatable with the first shaft and configured to engage, via the one or more intermediate components, one or more axially extending members connected to and rotatable with the second shaft to transfer drive between the first shaft and the second shaft,
wherein the device is configured to transmit drive from one of the first and second cowl actuation systems to the other of the first and second cowl actuation systems in an event of a failure or reduced drive of the other of the first and second cowl actuation systems.

2. A thrust reverser actuation system as claimed in claim 1, further comprising a motor configured to drive the first and second cowl actuation systems.

3. A thrust reverser actuation system as claimed in claim 2, wherein the motor is an electric motor and the thrust reverser actuation system further comprises a brake operatively connected to the motor and configured to stop or hold a load connected to the motor upon loss of electrical power to the motor.

4. A thrust reverser actuation system as claimed in claim 3, wherein the first cowl actuation system comprises a first primary drive shaft operatively connected to the motor and the second cowl actuation system comprises a second primary drive shaft operatively connected to the motor.

5. A thrust reverser actuation system as claimed in claim 4, wherein each of the first and second primary drive shafts is connected to a respective one of the first and second cowls via one or more gearboxes.

* * * * *